(12) United States Patent
Noguchi et al.

(10) Patent No.: US 6,272,980 B1
(45) Date of Patent: Aug. 14, 2001

(54) APPARATUS FOR PRODUCING TOFU

(75) Inventors: Shigeru Noguchi; Masaru Matsuura; Yoshiro Yamanaka; Jun Sasaki; Tomoko Takeuchi, all of Noda (JP)

(73) Assignee: Kikkoman Corporation, Noda (JP)

( * ) Notice: Subject to any disclaimer, the term of this patent is extended or adjusted under 35 U.S.C. 154(b) by 0 days.

(21) Appl. No.: 09/650,597

(22) Filed: Aug. 30, 2000

Related U.S. Application Data

(62) Division of application No. 09/363,434, filed on Jul. 29, 1999.

(30) Foreign Application Priority Data

Jul. 30, 1998 (JP) .................................................. 10-215831
Jul. 19, 1999 (JP) .................................................. 11-204077

(51) Int. Cl.$^7$ .................................. A23J 3/16; A23L 1/20
(52) U.S. Cl. .................................. 99/485; 99/486; 99/493; 73/64.41
(58) Field of Search ................................ 426/634; 99/485, 99/486, 493; 73/64.41

(56) References Cited

U.S. PATENT DOCUMENTS 5,074,201 * 12/1991 Takeyama et al. .

* cited by examiner

Primary Examiner—Anthony J. Weier
(74) Attorney, Agent, or Firm—Merchant & Gould P.C.

(57) ABSTRACT

A method for producing tofu is disclosed which includes the step of detecting the concentration of a coagulant in soybean milk. The coagulant concentration is detected by a coagulant concentration detector disposed downstream of a stirring apparatus in a soybean milk transfer circuit. The amount of addition of the coagulant is controlled by a coagulant concentration adjuster in accordance with the coagulant concentration detected by the coagulant concentration detector. This enables the mass production of tofu having a bouncy taste and excellent flavor.

5 Claims, 11 Drawing Sheets

APPARATUS FOR PRODUCING TOFU

This application is a divisional of application Ser. No. 09/363,434, filed Jul. 29, 1999, which application is incorporated herein by reference.

BACKGROUND OF THE INVENTION

1. Field of the Invention

The present invention relates to a method and an apparatus for producing tofu automatically.

2. Description of the Related Art

In Japan, tofu (soybean curd) has been manufactured from ancient times. In a traditional method of tofu production, soaked soybeans are first added with water and ground to provide a soybean slurry. The resulted soybean slurry is then heated and squeezed out from a cloth filter to provide hot soybean milk. Thereafter, the hot soybean milk is added with a coagulant and stirred to initiate the solidification of the milk. The good and bad of the solidification technique produce a large difference in quality of tofu. The solidification process is thus quite important for the production of tofu.

Recently, retort packed tofu, developed for mass production of tofu, has taken the place of the traditional tofu production method which requires an artisan's skill. Retort packed tofu is of the type called Kinu-tofu, because it has a smooth taste like silk as represented by the Japanese term Kinu. For producing Kinu-tofu, cold soybean milk, mixed uniformly with a coagulant, is filled in a container and sealed. Thereafter it is heated to a high temperature for solidification.

When coagulants such as a natural bittern (main components being magnesium chloride and calcium chloride) and quick-acting, formulated magnesium chloride and calcium chloride are used, it is difficult to restrain a solidifying reaction for a long time, even though the soybean milk is kept cold. It may often happen that the solidifying reaction progresses before the soybean milk is filled into a container or a shaping box, in which instance the end product tofu, though looks solidified nicely, becomes collapsible and presents a rough taste instead of a desired bouncy and smooth one.

In recent years, coagulant adding methods called in-line mixing methods have been proposed in which a coagulant solution is poured directly into a line and mixed with cold soybean milk flowing through the line. These methods are advantageous in that they significantly shorten the time from the addition of the coagulant solution to the filling of the soybean milk into a container. However, the amount of coagulant added during the shortened time is as little as 0.1 to 2.0 wt. % per 100 g of soybean milk. If the coagulant solution added to the soybean milk is not in a high concentration of 30% or more, protein in the milk begins solidifying, thereby causing the resultant tofu to have a rough taste. If the coagulant is added in excess, the resulting tofu will have astringency and/or bitterness which adversely affect a targeted flavor thereof. Thus, the amount of the added coagulant must be controlled precisely but this is difficult to achieve with the proposed in-line mixing methods.

In addition, unless the coagulant added to the soybean milk is uniformly dispersed in a short period of time, there arise variations in the concentration of the coagulant, which act as a bar to the manufacture of homogenized tofu products. The concept of continuously adding a coagulant into a line of tofu production and mixing them therein has not been so far applied to a line of mass production of tofu in an effective way. Failure to realize such an application is due to the unreliability of a system for adding a coagulant to soybean milk and stirring them.

SUMMARY OF THE INVENTION

In a continued research to overcome the foregoing problems, the present inventors have conceived a new method of automated production of tofu, in which after continuously added with a coagulant in a line of tofu production, soybean milk is stirred by an in-line mixer, and then the concentration of the added coagulant in the soybean milk is detected for controlling a coagulant supply apparatus based on the detected coagulant concentration. The method further continues with controlling the coagulant supply apparatus on the basis of the rate of flow of the soybean, followed by stirring the soybean milk by the in-line mixer. The inventors have perceived that the conceived method can achieve the precision addition and mixing of a coagulant to and with the soybean milk, and this had lead to the present invention.

According to a first aspect of the present invention, there is provided a method for producing tofu by continuously adding a coagulant to soybean milk in a soybean milk transfer circuit, which method comprises the steps of: stirring said soybean milk, after added with the coagulant, in the soybean milk transfer circuit; detecting the concentration of the coagulant in the soybean milk; and controlling the amount of addition of the coagulant on the basis of the detected concentration.

The step of detecting the coagulant concentration may be performed by using one of an electric conductivity measuring method and an ion measuring method. From the standpoint of precision and response capability, the electric conductivity measuring method is preferred.

Preferably, the method further comprises the steps of: measuring the electric conductivity of the soybean milk before and after added with the coagulant; and controlling the amount of addition of the coagulant on the basis of a difference between the detected conductivity values. This enables the desired control with increased precision. The difference in conductivity may be calculated by a calculator.

According to a second aspect of the present invention, there is provided a method for producing tofu by continuously adding a coagulant to soybean milk in a soybean milk transfer circuit, which method comprises the steps of: measuring the flow rate of the soybean milk; controlling the amount of addition of the coagulant in accordance with the detected flow rate value; and stirring the soybean milk added with the coagulant.

A soybean milk flow rate detector may be employed for measuring the flow rate of the soybean milk. The soybean milk flow rate detector is desirably disposed upstream of a coagulant adding section so that it can conveniently detect only the flow rate of the soybean milk and adjust a time lag in adding the coagulant.

According to a third embodiment of the present invention, there is provided a method for producing tofu by continuously adding a coagulant to soybean milk in a soybean milk transfer circuit, which method comprises the steps of: measuring the flow rate of the soybean milk; controlling the flow rate of the soybean milk in accordance with the detected flow rate value; controlling the amount of addition of the coagulant in accordance with the detected flow rate value; and stirring the soybean milk added with the coagulant.

With this arrangement, it becomes possible to control the flow rate of the soybean milk and the amount of addition of the coagulant at the same time.

According to a fourth aspect of the present invention, there is provided an apparatus for producing tofu by continuously adding a coagulant to soybean milk in a soybean milk transfer circuit, which apparatus comprises: a stirring apparatus disposed in the soybean milk transfer circuit for stirring the soybean milk to uniformly disperse the coagulant added to the soybean milk; coagulant supply means placed in fluid communication with the stirring apparatus for adding the coagulant to the soybean milk being transferred through the circuit; a coagulant concentration detector disposed downstream of a coagulant adding section for detecting the concentration of the coagulant in the soybean milk; and a coagulant concentration adjuster for controlling, on the basis of a detected signal from the coagulant concentration detector, the amount of addition of the coagulant supplied from the coagulant supply means.

An additional coagulant concentration detector may be disposed upstream of the coagulant adding section for detecting the concentration of the coagulant in the soybean milk. The coagulant concentration detector may comprise an electric conductivity detector for measuring the electric conductivity of the soybean milk added with the coagulant.

According to a fifth aspect of the present invention, there is provided an apparatus for producing tofu by continuously adding a coagulant to soybean milk in a soybean milk transfer circuit, which apparatus comprises: a stirring apparatus disposed in the soybean milk transfer circuit for stirring the soybean milk to uniformly disperse the coagulant added to the soybean milk; a soybean milk flow rate detector disposed at that part of the soybean milk transfer circuit positioned upstream of the stirring apparatus, for detecting the flow rate of the soybean milk; coagulant supply means placed in fluid communication with the stirring apparatus for adding the coagulant to the soybean milk being transferred through the circuit; and a coagulant flow rate adjuster for controlling, on the basis of a detected signal from the soybean milk flow rate detector, the coagulant supplied from the coagulant supply means.

According to a sixth aspect of the present invention, there is provided an apparatus for producing tofu by continuously adding a coagulant to soybean milk in a soybean milk transfer circuit, which apparatus comprises: a stirring apparatus disposed in the transfer circuit for stirring the soybean milk to uniformly disperse the coagulant added to the soybean milk; a soybean milk flow rate detector disposed at that part of the transfer circuit upstream of the stirring apparatus for detecting the flow rate of the soybean milk; a soybean milk flow rate adjuster for controlling, on the basis of a detected signal from the soybean milk flow rate detector, the flow rate of the soybean milk to remain constant; coagulant supply means placed in fluid communication with the stirring apparatus for adding the coagulant to the soybean milk being transferred through the circuit; a coagulant flow rate detector disposed on the coagulant supply means for detecting the amount of supply of the coagulant; and a coagulant flow rate adjuster for controlling, on the basis of a detected signal from the coagulant flow rate detector, the amount of addition of the coagulant supplied from the coagulant supply means.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
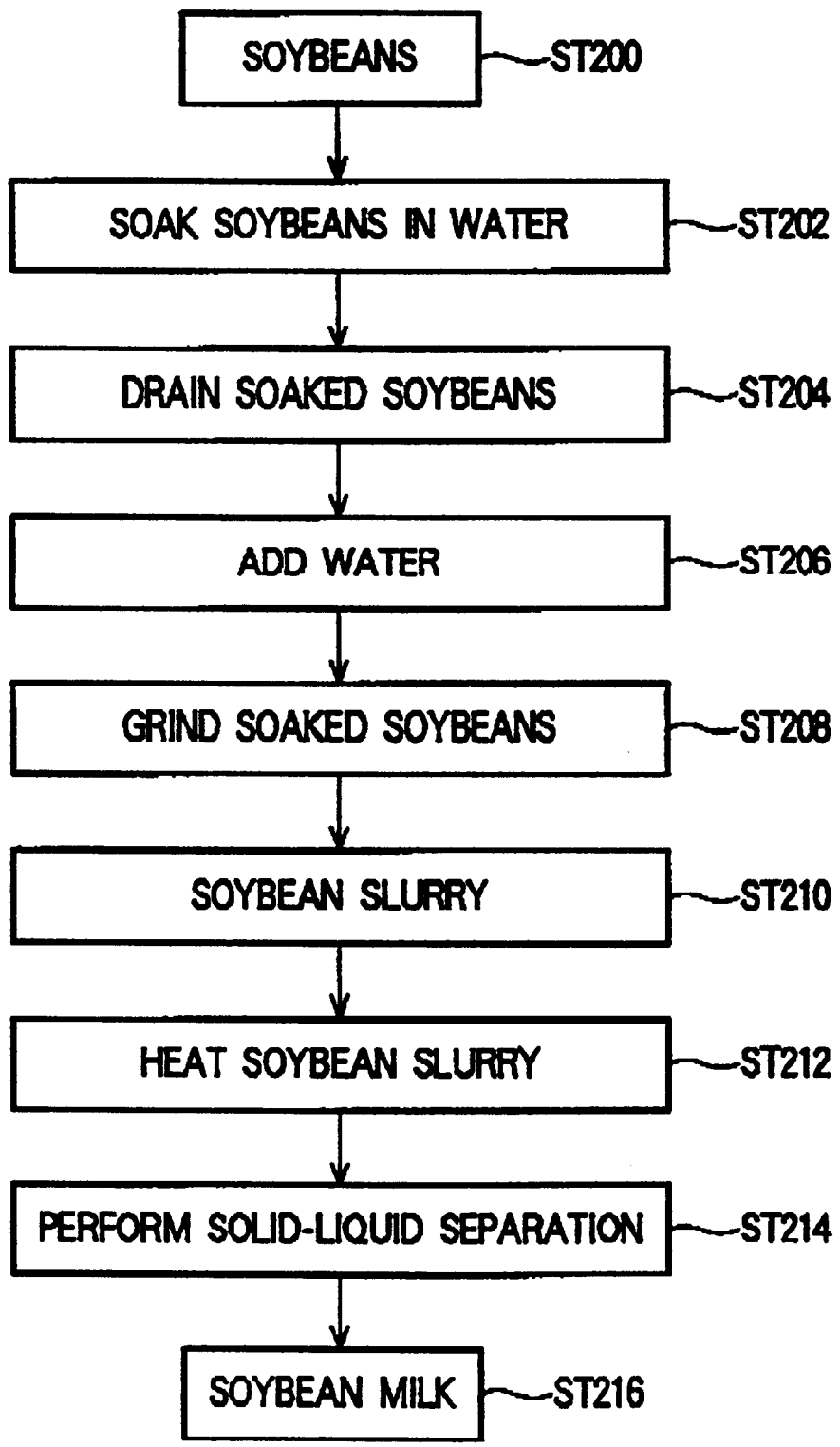
FIG. 1 illustrates a process for producing soybean milk from soybeans.

Although soybean milk is first produced in the present invention, the invention is not directed to a process for producing soybean milk, which may be produced in any known process, for example, one shown in FIG. 1. At STEP (hereinafter "ST") 200, soybeans as starting materials are obtained. These soybeans are soaked in water of 5 to 25° C. for 6 to 20 hours (ST 202) and drained (ST 204). Then, the soybeans, while being added with water in the amount of 4 to 15 times the weight of the soybeans (ST 206), are fed into a grinder and ground therein (ST 208). Soybean slurry resulted from the grinding (ST 210) is heated at a temperature in a range of 80 to 120° C. for 0.5 to ten minutes (ST 212). Thereafter, the soybean slurry is put into a cloth bag and pressed so that it is separated into solid and liquid portions (ST 214). Finally the liquid portion is filtered to provide soybean milk (ST 216).

Alternatively, without soaking them in water, raw or hulled soybeans, added with water in the amount of 4 to 15 times the weight of the soybean, may be fed into a grinder and ground therein. The resulting soybean slurry is heat treated as in the process described above.

It is not absolutely necessary to use particular coagulants. Any ordinary coagulants, including natural bittern, magnesium chloride and calcium chloride, may be used. They may be in a liquid form having an ordinarily used concentration in a range of 30 to 80% (W/W).

For controlling the addition of a coagulant, two methods are available, namely, one in which the amount of a coagulant to be added is controlled by measuring the concentration of a coagulant in soybean milk and the other in which the amount of a coagulant to be added is controlled by measuring the flow rate of soybean milk. Although the former method specifically includes an electric conductivity measuring method, an ion selective electrode (measuring) method and an electrometric titration method, the electric conductivity measuring method is best suited for the intended control in terms of precision and response capability. The electric conductivity measuring method is also advantageous in that in a control for measuring a coagulant concentration, it will not be influenced by the concentration of a coagulant per se to be added.

For controlling the amount of addition of a coagulant by the electric conductivity measuring method, two specific control methods are available, namely, one in which the amount of addition of a coagulant is controlled by measuring only the electric conductivity of soybean milk after addition of a coagulant thereto and the other in which electric conductivity is measure of soybean milk before and after addition of a coagulant thereto and, in accordance with a measured difference in conductivity, a coagulant is added to the soybean milk. The former method is practiced on the premise that the electric conductivity of soybeans milk is constant. The electric conductivity of soybeans becomes constant when raw materials and a production method are constant and when the soybeans have a fixed concentration. Thus, if a concentration of the soybeans before addition of a coagulant thereto is known in advance, the control can be performed based on a single measurement with respect to the soybeans after added with a coagulant thereto.

Figure 3:
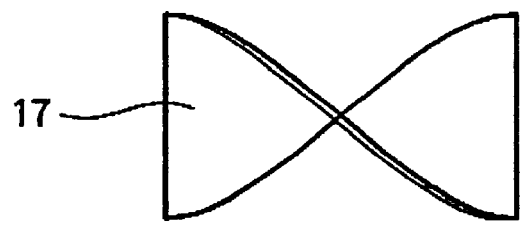
FIG. 3 is a detailed front elevational view of a wing member in a stirrer shown in FIG. 2.
Figure 4:
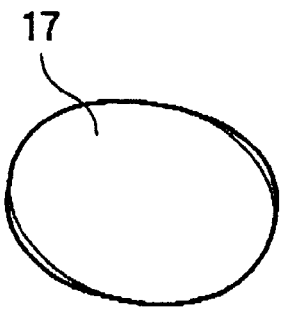
FIG. 4 is a detailed top plan view of the wing member of FIG. 3.
Figure 5:
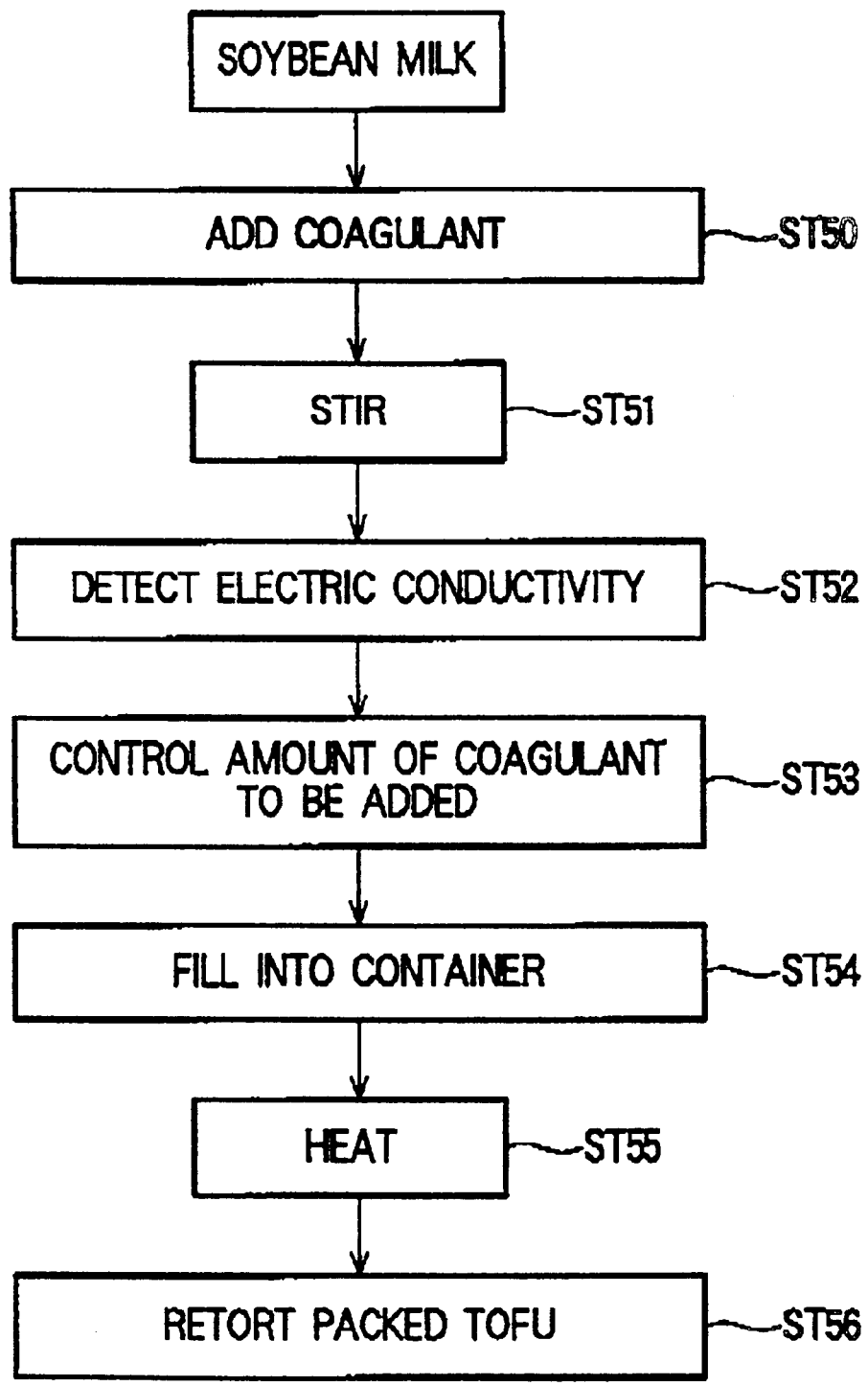
FIG. 5 illustrates a process for producing tofu in accordance with the first embodiment shown in FIG. 2.

FIGS. 2 to 5 illustrates a first embodiment of the present invention. As shown in FIG. 5, soybean milk, added with a coagulant (ST 50), is stirred, by means of a mixer called static mixer, to uniformly disperse the added coagulant therein (ST 51). Then the concentration or electric conductivity of the soybean milk is measured (ST 52). Thereafter, the amount of addition of a coagulant is controlled in accordance with the resulted measurement (ST 53). This is followed by filling the soybean milk into a container (ST 54). The soybean milk filled into the container is heated at a temperature in a range of 80 to 90° C. for 40 to 60 minutes (ST 55) to thereby provide retort packed tofu (ST 56).

Turning back to FIG. 2, a soybean tank 1 is connected to a liquid pump 2 through a soybean milk transfer pipe 4. The pump 2 is connected to a stirring apparatus 3 via a soybean milk transfer pipe 5. A soybean milk discharge pipe 6 is connected to a discharge side of the stirring apparatus 3. The liquid pump 2 desirably comprises a rotary- or Mono-type positive displacement pump, so that it can achieve the required quantitative transfer.

Also connected to the stirring apparatus 3 is a coagulant adding pipe 7 for adding a coagulant to soybean milk passing through the stirring apparatus 3. Upstream side of the coagulant adding pipe 7 is connected to a coagulant supply pump 8 and a coagulant tank 9. Disposed on the soybean milk discharge pipe 6 is a electric conductivity detector 10 for detecting the concentration of the coagulant. A detected signal is fed to a coagulant concentration adjuster 11. The amount of addition of the coagulant is controlled by continuously varying the rotation speed of the coagulant supply pump 8 through the coagulant concentration adjuster 11 fed with the signal from the electric conductivity detector 10.

The coagulant adding pipe 7 may be connected to the soybean milk transfer pipe 4 or soybean milk transfer pipe 5. In this instance, the soybean milk transfer pipes 4, 5 and the soybean milk discharge pipe 6 jointly form a soybean milk transport circuit.

As the stirring apparatus 3, a so-called static mixer may preferably be used, which comprises a cylindrical member 15 and a stationary blade 16 received therein.

Figure 2:
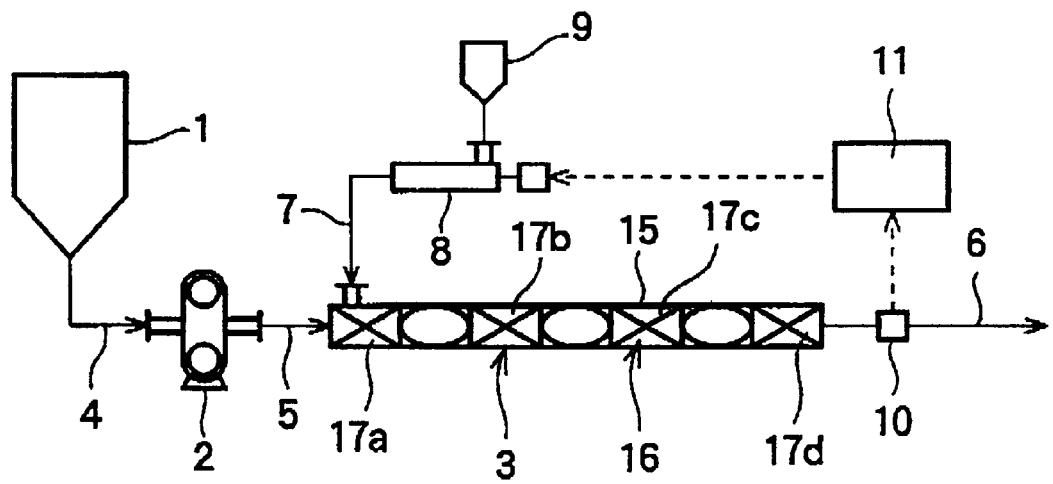
FIG. 2 is a schematic diagram illustrating an apparatus for producing tofu by measuring the concentration of a coagulant, according to a first embodiment of the present invention.

The stationary blade 16 is equipped with a wing member 17 formed from a plate-shaped member twisted 90 degrees about its central part so that it has an axially spiral configuration, as shown in FIGS. 3 and 4. A plurality of the thus-formed stationary blades 16 are axially sequentially disposed in the stirring apparatus 3 with their phases displaced from each other, as shown in FIG. 2.

By this arrangement, liquid to be treated, as it advances, is bisected by the first wing member 17a, divided into four equal portions by the second wing member 17b, into eight equal portions by the third wing member 17c and into sixteen equal portions by the fourth and last wing member 17d. Thus, the liquid is stirred in such a minutely-sectioned state.

In the embodiment just described, the concentration of the soybean milk, added with a coagulant, is measured at only one downstream spot. This enables the provision of a tofu production apparatus which is simple in construction.

Discussion will be made next as to a second embodiment of the present invention with reference to FIGS. 6 and 7. Apart from those described in relation to the embodiment of FIG. 2, the apparatus according to the second embodiment includes an electric conductivity detector 10a disposed upstream of the coagulant adding section, and a calculator 19 for calculating a difference in electric conductivity between signals fed from the two electric conductivity detectors 10, 10a, that is, a difference in electric conductivity between the soybean milk before and after added with a coagulant and outputting a corresponding signal to the coagulant concentration adjuster 11. In the present embodiment, since the electric conductivity is measure of the soybean milk before and after added with the coagulant, high precision control is enabled.

Figure 7:
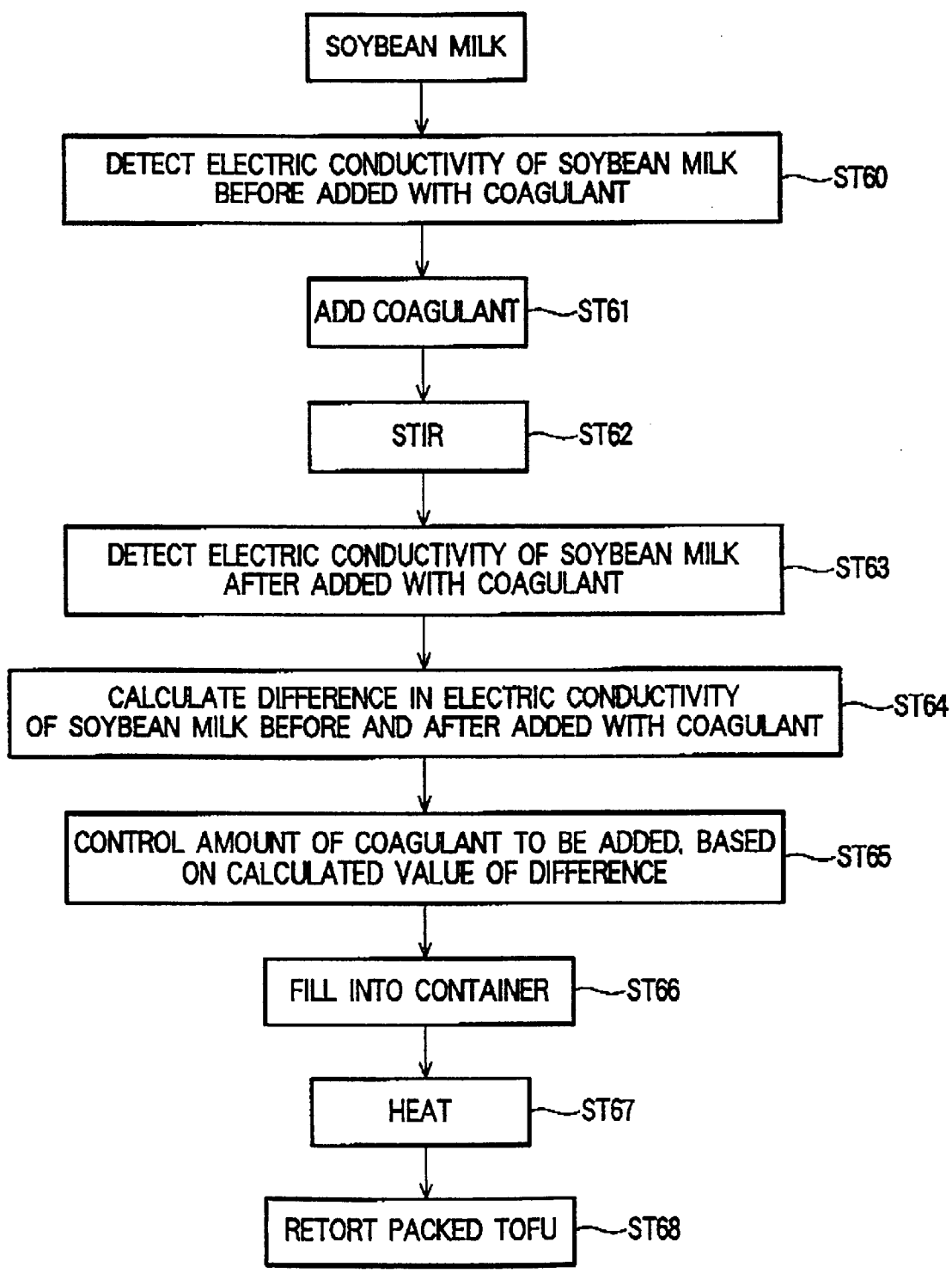
FIG. 7 illustrates a process for producing tofu in accordance with the second embodiment shown in FIG. 6.

Turning now to FIG. 7, the electric conductivity of the soybean milk before added with a coagulant is detected by the electric conductivity 10a (ST 60). The detected signal is fed to the calculator 19. The soybean milk added with a coagulant (ST 61) is stirred by the stirring apparatus 3 (ST 62) to uniformly disperse the coagulant. The electric conductivity of the soybean milk after added with the coagulant is detected by the electric conductivity detector 10 (ST 63). The detected signal is fed to the calculator 19. The calculator 19 calculates a difference in electric conductivity between the soybean milk before and after addition of the coagulant (ST 64) and supplies a corresponding signal to the coagulant concentration adjuster 11. Based on the difference signal from the calculator 19, the adjuster 11 controls the supply pump 8 so as to control the amount of addition of a coagulant (ST 65). The coagulant amount adjusted soybean milk is filled into a container (ST 66). Thereafter, the soybean milk in the container is heated at a temperature in a range of 80 to 90° C. for 40 to 60 minutes (ST 67) to provide retort packed tofu (ST 68).

Figure 8:
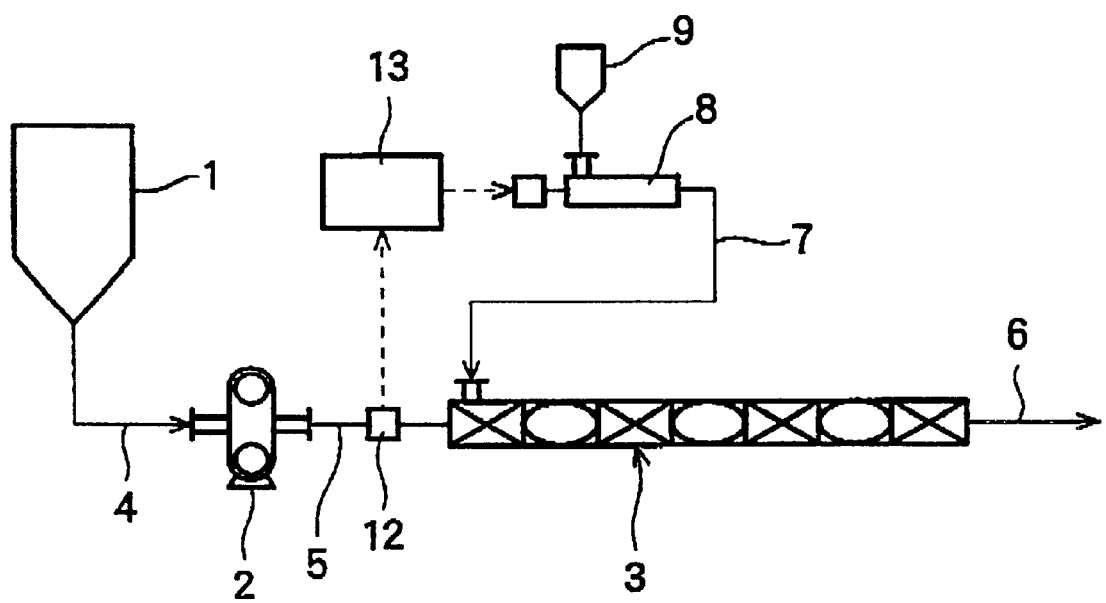
FIG. 8 is a schematic diagram illustrating an apparatus for producing tofu, according to a third embodiment of the present invention, in which the amount of coagulant is controlled by measuring the flow rate of soybean milk.
Figure 9:
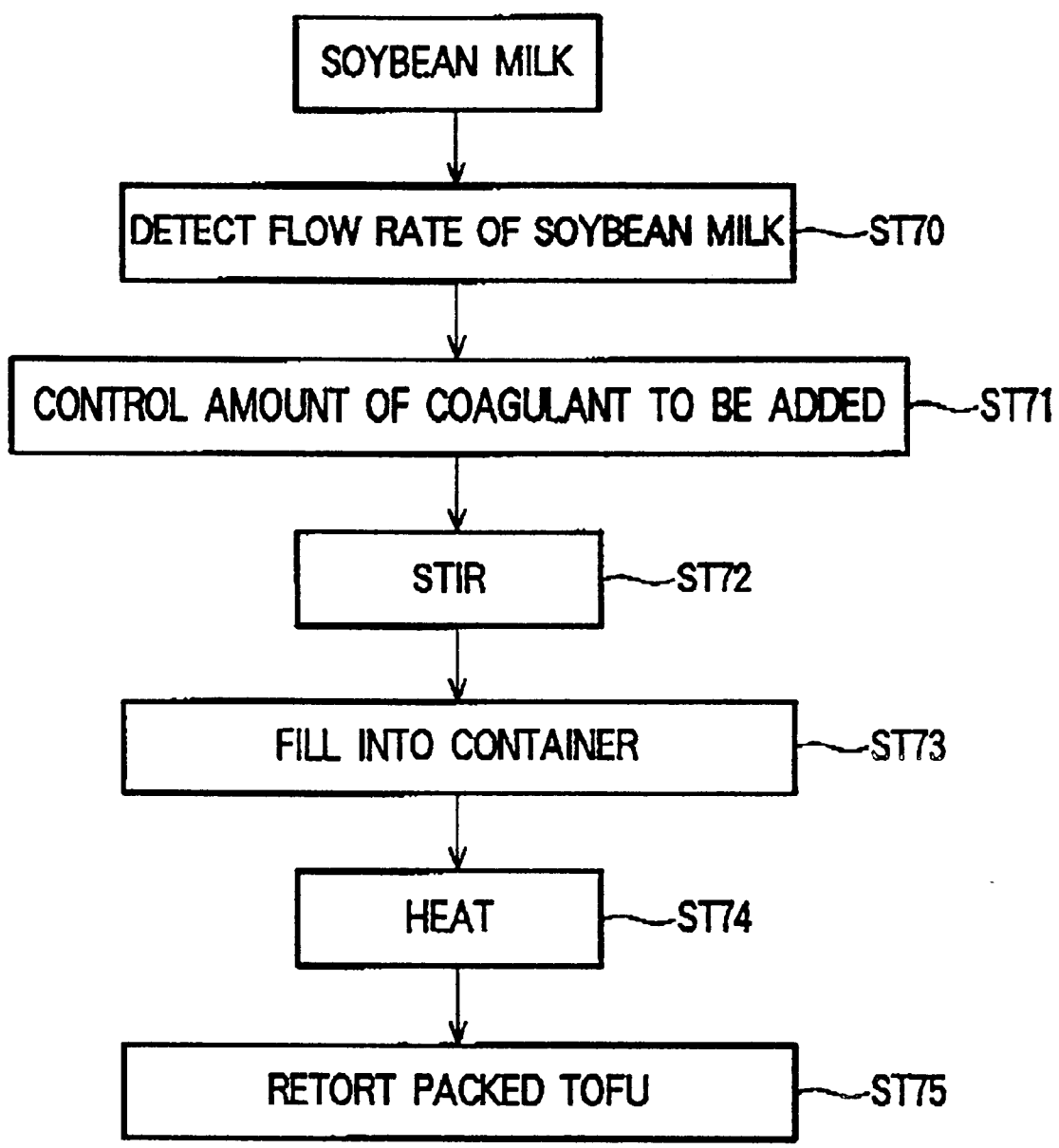
FIG. 9 illustrates a process for producing tofu in accordance with the third embodiment shown in FIG. 8.

Next, a third embodiment of the present invention will be discussed with reference to FIGS. 8 and 9. In place of the electric conductivity detectors 10, 10a described in relation to the embodiments of FIGS. 2 and 6, the apparatus according to the third embodiment has a flow rate detector 12 disposed upstream of the coagulant supply section for detecting the flow rate of a coagulant. The flow rate detector 12 is disposed on the soybean milk transfer pipe 5 and supplies a detected signal (ST 70) to the coagulant flow rate adjuster 13. Upon fed with a signal from the flow rate detector 12, the coagulant flow rate adjuster 13 continuously varies the rotational speed of the coagulant supply pump 8 to thereby control the amount of addition of the coagulant (ST 71). Being positioned upstream of the coagulant adding section, the flow rate detector 12 can detect only the flow rate of the soybean milk and adjust the position of coagulant addition or time lag of addition, thereby achieving the desired precision control. Continuously, the coagulant added soybean milk is stirred by the stirring apparatus 3 (ST 72) and then filled into a container (ST 73). The soybean milk filled into the container is heated at a temperature in the range of 80 to 90° C. for 40 to 60 minutes (ST 74) to provide retort packed tofu (ST 75).

Fourth embodiment of the present invention will now be described with reference to FIGS. 10 and 11. This embodiment exemplifies the provision of two coagulant supply means for feeding two different coagulants, e.g., magnesium chloride and calcium chloride, into soybean milk.

Figure 10:
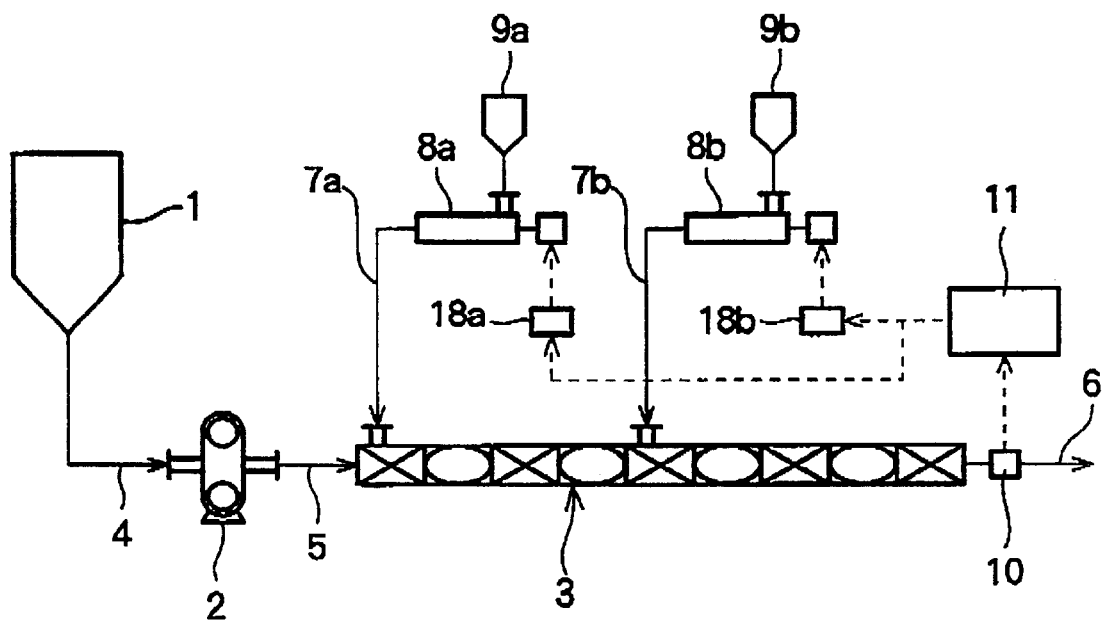
FIG. 10 is a schematic diagram illustrating an apparatus for producing tofu, according to a fourth embodiment of the present invention, in which the concentration of one coagulant is detected and, based on a detected signal, the amounts of additional coagulants are controlled.

As shown in FIG. 10, a first coagulant adding pipe 7a is coupled to a position upstream of the stirring apparatus 3. On an upstream side of the first coagulant adding pipe 7a, a first coagulant supply pump 8a and a first coagulant tank 9a are connected to each other. The first coagulant tank 9a reserves a first coagulant, e.g., magnesium chloride. The amount of supply of the first coagulant by the first coagulant supply pump 8a is controlled by a first ratio calculator 18a. The first ratio calculator 18a calculates a supply ratio of the first coagulant on the basis of a signal output from the coagulant concentration adjuster 11. The first coagulant adding pipe 7a, the first coagulant supply pump 8a, the fist coagulant tank 9a and the first ratio calculator 18a jointly constitute first coagulant supply means.

A second coagulant adding pipe 7b is connected to a position midstream of the stirring apparatus 3. On an upstream side of the second coagulant adding pipe 7b, a second coagulant supply pump 8b and a second coagulant tank 9b are connected. In the second coagulant tank 9b, a second coagulant, e.g., calcium chloride, is held. The second coagulant supply pump 8b supplies a predetermined amount of the second coagulant through the control of a second ratio calculator 18b. The second ratio calculator 18b calculates a ratio of supply of the second coagulant on the basis of a signal output from the coagulant concentration adjuster 11. The second coagulant adding pipe 7b, the second coagulant supply pump 8b, the second coagulant tank 9b and the second ratio calculator jointly constitute second coagulant supply means.

Figure 11:
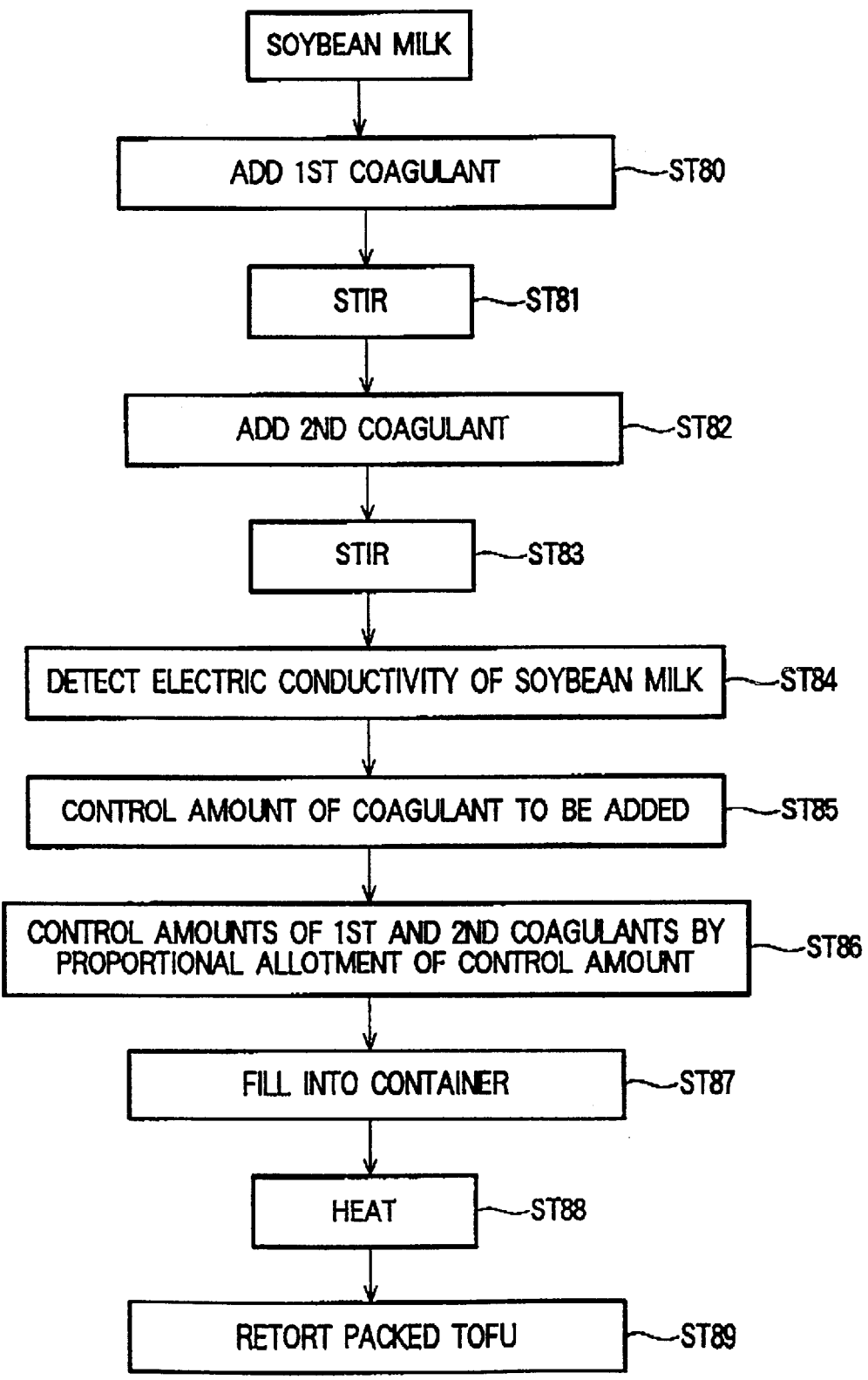
FIG. 11 illustrates a process for producing tofu in accordance with the fourth embodiment shown in FIG. 10.

As shown in FIG. 11, soybean milk, added with the first coagulant (ST 80), is stirred by the stirring apparatus 3 (ST 81). The resulted soybean milk is then added with the second coagulant (ST 82) and stirred again by the stirring apparatus 3 (ST 83). Thereafter, the electric conductivity of the soybean milk, added with the two different coagulants, is detected the electric conductivity detector 10 (ST 84). The detected signal is fed to the coagulant concentration adjuster 11, which then calculates and controls the amount of addition of the second coagulant (ST 86). Subsequently, the soybean milk, added with the coagulants at target ratios, is filled into a container (ST 87). The soybean milk filled into the container is heated at a temperature in a range of 80 to 90° C. for 40 to 60 minutes (ST 88) to thereby provide retort packed tofu (ST 89).

In the fourth embodiment thus arranged, it becomes possible to add different kinds of coagulants to soybean milk at desired ratios.

Figure 12:
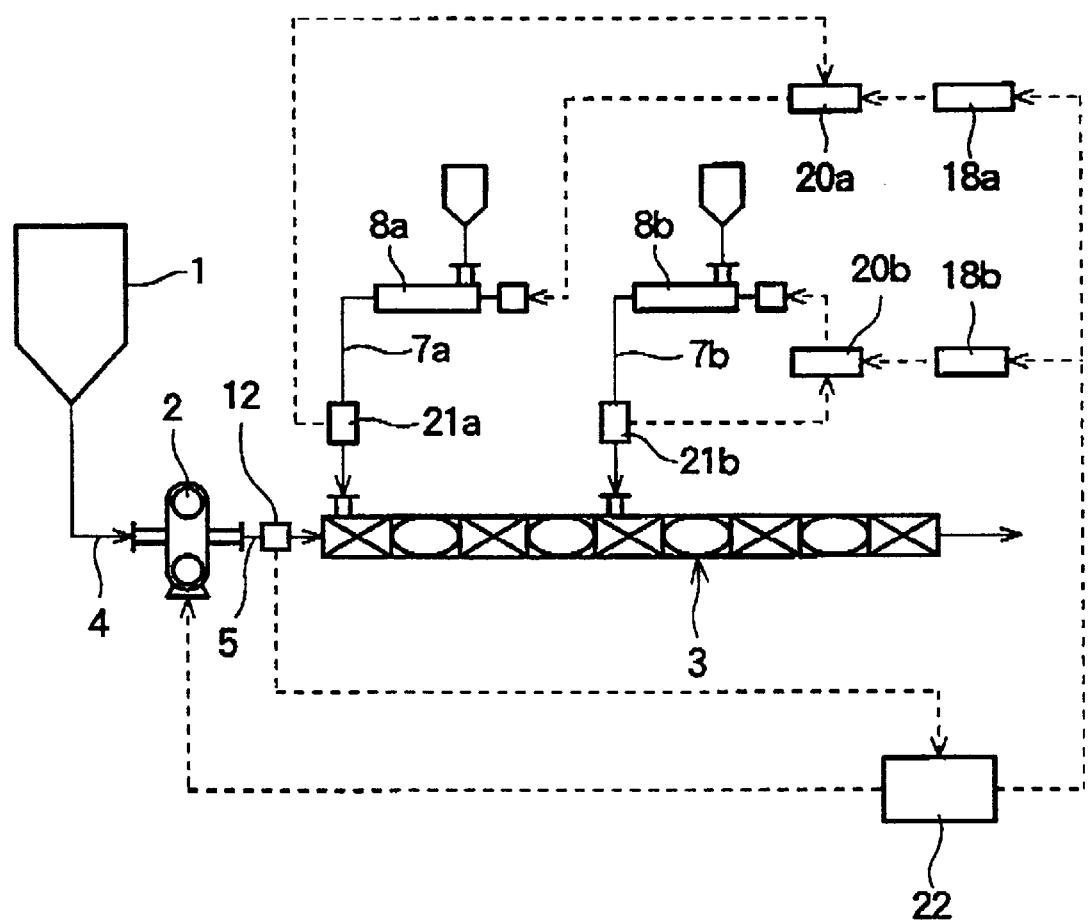
FIG. 12 is a schematic diagram illustrating an apparatus for producing tofu, according to a fifth embodiment of the present invention, in which the flow rate of soybean milk and the amount of a coagulant to be added are controlled.

Discussion will be made next as to the fifth embodiment of the present invention with reference to FIGS. 12 and 13. In this embodiment, the flow rate detector 12 is disposed on the soybean milk transfer pipe 5 for detecting the flow rate of soybean milk therein. A signal detected by the detector 12 is fed to a soybean milk flow rate adjuster 22 where the liquid pump 2 is controlled such that the flow rate of the soybean milk is kept constant. The detected signal representing the flow rate of the soybean milk is fed from the soybean milk flow rate adjuster 22 to first and second coagulant flow rate adjuster through the first and second ratio calculators 18a, 18b.

For detecting the amount of addition of the coagulants, first and second coagulant flow rate detectors 21a, 21b are disposed on the first and second coagulant adding pipes 7a, 7b, respectively. Signals detected by the first and second coagulant flow rate detectors 21a, 21b are fed to their respective coagulant flow rate adjusters 20a, 20b, which then control the respective first and second coagulant supply pumps 8a, 8b. The coagulant corresponding to the detected value of the soybean milk flow rate detector 12 is proportionally allotted by the first and second ratio calculators 18a, 18b for subsequent addition to the soybean milk. Thus, in the embodiment being described, quantitativeness in both the soybean milk flow rate and the coagulant addition amount can be achieved.

Figure 13:
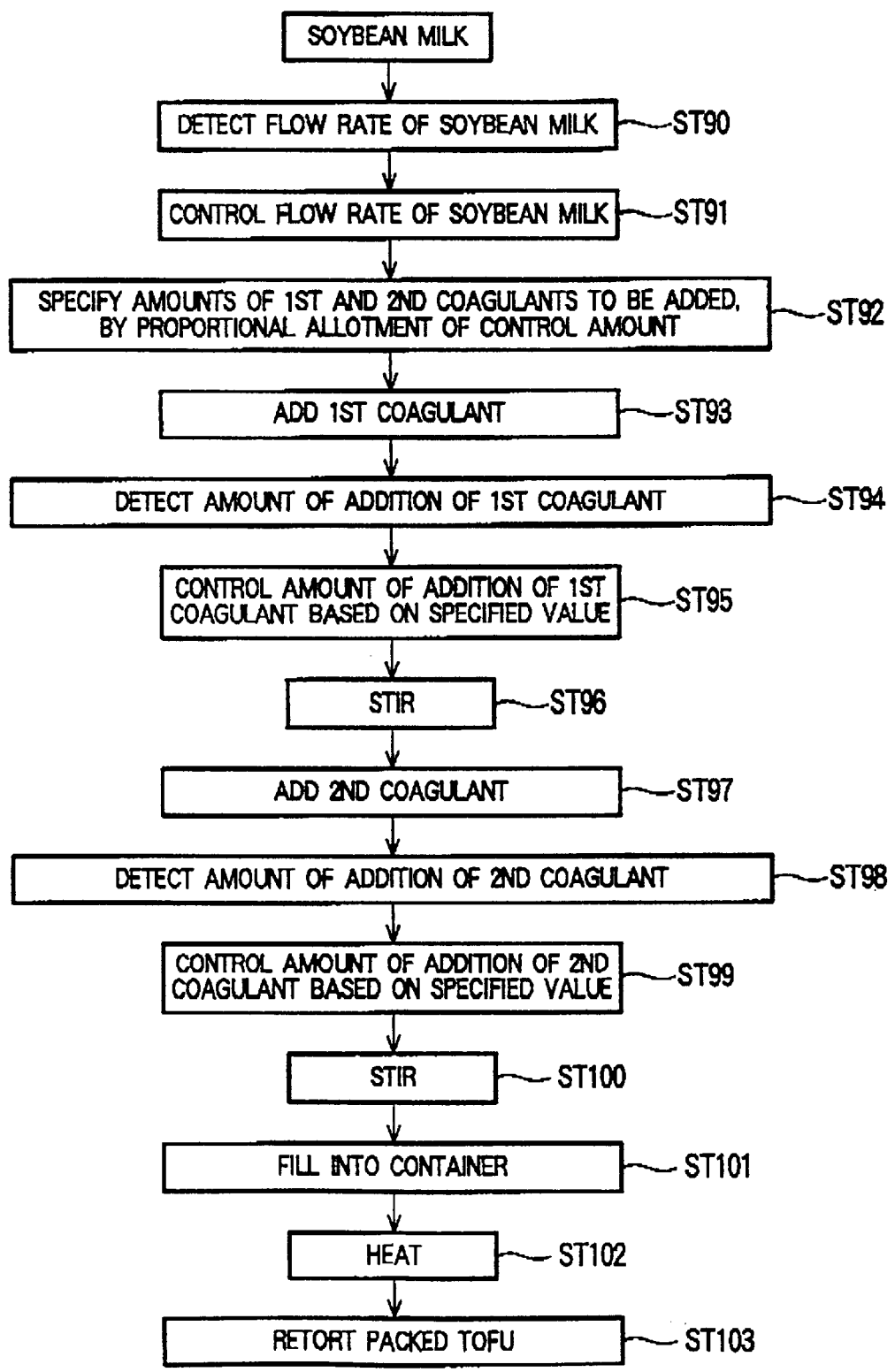
FIG. 13 illustrates a process for producing tofu in accordance with the fifth embodiment shown in FIG. 12.

Referring now to FIG. 13, the flow rate of the soybean milk is detected by the soybean milk flow rate detector 12 at ST 90. Based on the detected signal, the soybean milk flow rate adjuster 22 controls the flow rate of the soybean milk through control of the liquid pump 2 (ST 91). On the basis of the signal fed from the soybean milk flow rate adjuster 22, the first and second ratio calculators 18a, 18b proportionally allot the coagulant control amounts to thereby specify the amounts of addition of the first and second coagulants (ST 92). Thereafter, the first coagulant is added (ST 93), the amount of the added first coagulant is detected by the first coagulant flow rate detector 21a (ST 94). The detected coagulant flow rate signal is fed to the first coagulant flow rate adjuster 20a, whereupon the amount of addition of the first coagulant is controlled based on the specified value (ST 95). The stirring apparatus 3 now starts operation and stirs the soybean milk (ST 96). Next, the second coagulant is added (ST 97). The amount of the added second coagulant is detected by the second coagulant flow rate detector 21b (ST 98). The detected coagulant flow rate signal is fed to the second coagulant flow rate adjuster 20b, whereupon the amount of addition of the second coagulant is controlled on the basis of the specified value (ST 99). This is followed by stirring the soybean milk by the stirring apparatus 3 (ST 100). Continuously, the soybean milk is filled into a container (ST 101) and heated at a temperature in a range of 80 to 90° C. for 40 to 60 minutes (ST 102) to thereby provide retort packed tofu (ST 103).

EXAMPLE EXPERIMENT

Whole soybeans were washed with water and soaked in water overnight. The soaked soybeans were then ground, while adding water in an amount of four times the weight of the soybeans, in a horizontal grinder (TK Homomic line mill available from Tokushu Kika Kogyo Co., Ltd.).

The ground material was continuously heated to 65° C. by using a double pipe heater and then further heated up to 105° C. by blowing steam thereat and held in that state for 30 minutes. Thereafter, the material was cooled down to 80° C. and subjected to solid-liquid separation, performed by using a screw decanter made by Tanabe-Weltech, Ltd., to produce soybean milk. The obtained soybean milk was deaerated in a vacuum chamber (260 Torr) and then cooled 10° C. by using a plate cooler to thereby provide soybean milk with a protein concentration of 6.5% (T.N.×6.25).

Figure 6:
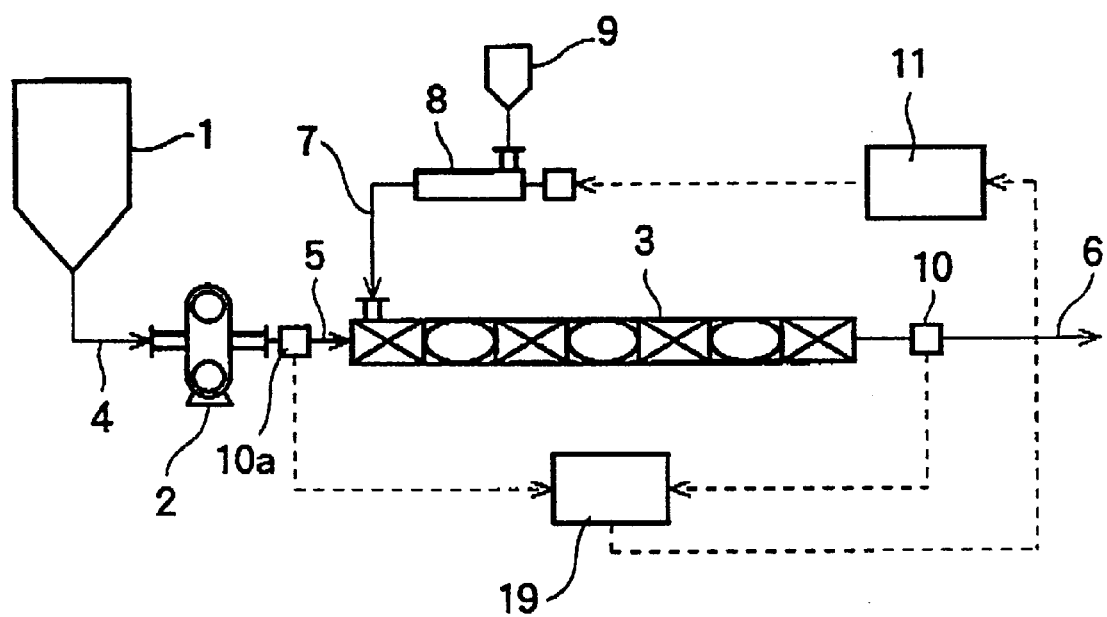
FIG. 6 is a schematic diagram illustrating an apparatus for producing tofu by measuring the concentration of a coagulant, according to a second embodiment of the present invention.

The thus obtained soybean mild (10° C.) was poured into the tank 1 shown in FIG. 6 and then fed quantitatively to the stirring apparatus 3 by means of the liquid pump 2, where a liquid blend of magnesium chloride (hexahydrate chloride) and calcium chloride (dihydrate chloride) (blend ratio: 26:7 (W/W); concentration: 39.7% (W/W)) was added and stirred sufficiently by the stirring apparatus 3. Then, the concentration of coagulant in the soybean milk, before and after addition of a coagulant, was detected by means of an electric conductivity indicator-adjuster (CDIC-6 available from Toa Radiowave Industrial Co., Ltd.) 10, 10a. Signals corresponding to the detected values were fed to the calculator 19 and further to the coagulant concentration adjuster 11. Then, the rotational speed of the coagulant supply pump 8 was controlled and the amount of addition of a coagulant was adjusted to 0.83% (W/W) relative to the coagulant.

Thereafter, the soybean milk held at a temperature of 10 to 20° C. was filled into a container (300 g; made from polypropylene) and sealed with a plastic film (made from NY/CPP). The thus packed soybean milk was immediately place in a tank of hot water of 80° C. and kept therein for 50 minutes, following which it was moved into a cooling water tank and cooled down to 15° C. to thereby provide retort packed tofu as an end product. The thus obtained retort packed tofu had a bouncy and smooth taste.

As thus far explained in detail, the present invention enables the control of the amount of addition of a coagulant to a suitable one, whereby the production of tofu excellent in taste and flavor become possible.

Obviously, various minor changes and modifications of the present invention are possible in the light of the above teaching. It is therefore to be understood that within the scope of the appended claims, the present invention may be practiced otherwise than as specifically described.

What is claimed is:

1. An apparatus for producing tofu by continuously adding a coagulant to soybean milk in a soybean milk transfer circuit, comprising:

a stirring apparatus disposed in said soybean milk transfer circuit for stirring said soybean milk to uniformly disperse said coagulant added to said soybean milk;

a soybean milk flow rate detector disposed at that part of said soybean milk transfer circuit positioned upstream of and said stirring apparatus, for detecting the flow rate of said soybean milk;

coagulant supply means placed in fluid communication with said stirring apparatus for adding the coagulant to said soybean milk being transferred through said circuit; and a coagulant flow rate adjuster for controlling, on the basis of a detected signal from said soybean milk flow rate detector, the coagulant supplied from said coagulant supply means.

2. An apparatus for producing tofu by continuously adding a coagulant to soybean milk in a soybean milk transfer circuit, comprising:

a stirring apparatus disposed in said transfer circuit for stirring said soybean milk to uniformly disperse the coagulant added to said soybean milk;

a soybean milk flow rate detector disposed at that part of said transfer circuit upstream of said stirring apparatus for detecting the flow rate of said soybean milk;

a soybean milk flow rate adjuster for controlling, on the basis of a detected signal from said soybean milk flow rate detector, the flow rate of said soybean milk to remain constant;

coagulant supply means placed in fluid communication with said stirring apparatus for adding the coagulant to said soybean milk being transferred through said circuit;

a coagulant flow rate detector disposed on said coagulant supply means for detecting the amount of supply of said coagulant; and a coagulant flow rate adjuster for controlling, on the basis of a detected signal from said coagulant flow rate detector, the amount of addition of the coagulant supplied from said coagulant supply means.

3. An apparatus for producing tofu by continuously adding a coagulant to soybean milk in a soybean milk transfer circuit, comprising:

a stirring apparatus disposed in said soybean milk transfer circuit for stirring said soybean milk to uniformly disperse said coagulant added to said soybean milk;

coagulant supply means placed in fluid communication with said stirring apparatus for adding said coagulant to said soybean milk being transferred through said circuit;

a coagulant concentration detector disposed downstream of a coagulant adding section for detecting the concentration of the coagulant in said soybean milk; and a coagulant concentration adjuster for controlling, on the basis of a detected signal from said coagulant concentration detector, the amount of addition of the coagulant supplied from said coagulant supply means.

4. An apparatus for producing tofu, according to claim 3, wherein an additional coagulant concentration detector is disposed upstream of said coagulant adding section for detecting the concentration of the coagulant in said soybean milk.

5. An apparatus for producing tofu, according to claim 4, wherein each of said coagulant concentration detectors comprises an electric conductivity detector.

* * * * *